US012779730B2

(12) United States Patent
Wang et al.

(10) Patent No.: US 12,779,730 B2
(45) Date of Patent: Nov. 3, 2026

(54) CERAMIC THREE-DIMENSIONAL (3D) PRINTING DEVICE BASED ON GEL MOLDING PROCESS AND CONTROL METHOD

(71) Applicant: Shenzhen Adventure Technology Co., Ltd., Shenzhen (CN)

(72) Inventors: Feng Wang, Shenzhen (CN); Pengfei Zhu, Shenzhen (CN)

(73) Assignee: Shenzhen Adventure Technology Co., Ltd., Shenzhen (CN)

(*) Notice: Subject to any disclaimer, the term of this patent is extended or adjusted under 35 U.S.C. 154(b) by 79 days.

(21) Appl. No.: 18/915,415

(22) Filed: Oct. 15, 2024

(65) Prior Publication Data

US 2025/0214280 A1 Jul. 3, 2025

(30) Foreign Application Priority Data

Dec. 29, 2023 (CN) ........................ 202311871516.9

(51) Int. Cl.

| | |
|---|---|
| ***B28B 1/00*** | (2006.01) |
| ***B28B 17/00*** | (2006.01) |
| ***B33Y 30/00*** | (2015.01) |
| ***B33Y 50/02*** | (2015.01) |
| ***B33Y 70/00*** | (2020.01) |

(52) U.S. Cl.

CPC .......... *B28B 1/001* (2013.01); *B28B 17/0081* (2013.01); *B33Y 30/00* (2014.12); *B33Y 50/02* (2014.12); *B33Y 70/00* (2014.12)

(58) Field of Classification Search

None

See application file for complete search history.

(56) References Cited

FOREIGN PATENT DOCUMENTS

| | | | | | |
|---|---|---|---|---|---|
| CN | 109822712 | A | | 5/2019 | |
| CN | 114131752 | A | | 3/2022 | |
| CN | 114801167 | A | * | 7/2022 | ............. B33Y 30/00 |
| KR | 20220083892 | A | | 6/2022 | |

* cited by examiner

*Primary Examiner* — Virak Nguon

(57) ABSTRACT

The present disclosure provides a ceramic three-dimensional (3D) printing device based on a gel molding process and a control method. The ceramic 3D printing device based on a gel molding process includes a feeding assembly, a receiving assembly, a scraping assembly, and a spray assembly. The feeding assembly includes a feeding pump and a storage hopper. The receiving assembly includes a feeding rod. The feeding pump can convey slurry in the storage hopper to the feeding rod. The control method includes introducing the atomized liquid into the storage hopper and the bearing groove through the first spray pipe and the second spray pipe respectively. According to the present disclosure, a water content of the slurry can be controlled to achieve a better curing effect.

12 Claims, 6 Drawing Sheets

CERAMIC THREE-DIMENSIONAL (3D) PRINTING DEVICE BASED ON GEL MOLDING PROCESS AND CONTROL METHOD

CROSS REFERENCE TO RELATED APPLICATIONS

The present application claims the benefit of Chinese Patent Application No. 202311871516.9 filed on Dec. 29, 2023, the contents of which are incorporated herein by reference in their entirety.

TECHNICAL FIELD

The present disclosure relates to the technical field of 3D printing, and in particular, to a ceramic three-dimensional (3D) printing device based on a gel molding process and a control method.

BACKGROUND

Photocuring 3D printing technique is an additive manufacturing technology, which implements rapid prototyping by curing a liquid photosensitive material layer by layer. The photocuring 3D printing technique is widely used in the fields of mold manufacturing and industrial design, and the like, and has also been used to directly manufacture some products, such as ceramic products. A ceramic 3D printing device usually includes a storage assembly, a scraper assembly, and a scanning assembly, where the storage assembly is configured to store slurry, the scraper assembly is configured to convey the slurry to a workbench layer by layer, and the scanning assembly is configured to scan, cure and mold the slurry according to a preset pattern. This process is repeated until a preset three-dimensional sample is completely formed.

The existing photocuring 3D printing technique needs stable paste properties to improve quality of a finished product. To this end, those skilled in the art currently achieve the above objective by adding a gelling agent to water-based slurry. However, during storage and molding of the slurry, the water-based slurry is likely to absorb water and water in the slurry is volatilized, and a state of the gelling agent in the slurry is affected by the water content, so that if the water is excessively volatilized, the gelling agent may be converted from a dispersed state to a gel state. Therefore, it is necessary to strictly control the water content. However, an existing ceramic 3D printing device can only control a feeding speed and a molding speed, but cannot accurately control the water content in the slurry. Too little water may cause the gelling agent to coagulate in advance, while too much water may cause obvious refraction and scattering effects, which affect the laser scanning and curing, thereby affecting molding quality and accuracy. Therefore, it is necessary to solve the problem that the water content of the slurry cannot be accurately controlled in the existing ceramic 3D printing device.

SUMMARY

Against the technical problem to be solved by the present disclosure, a ceramic 3D printing device based on a gel molding process is provided, to control a water content of slurry to achieve a better curing effect.

In order to solve the above technical problems, the present disclosure provides a ceramic 3D printing device based on a gel molding process, including a frame, and a feeding assembly, a receiving assembly, a scraping assembly, a bearing assembly, a scanning assembly and a spray assembly that are arranged on the frame, where the feeding assembly includes a feeding pump and a storage hopper, an input end of the feeding pump communicates with the storage hopper, and an output end of the feeding pump communicates with a feeding rod of the receiving assembly.

The bearing assembly includes a bearing groove, a scraping plate, a molding cylinder provided on the scraping plate, a lifting plate arranged at a bottom of the molding cylinder, and a lifting driving member in transmission connection with the lifting plate. An outlet of the feeding rod leads to the bearing groove, and the bearing groove is connected to the scraping plate. The lifting driving member can drive the lifting plate to move up and down in the molding cylinder.

The scraping assembly includes a movement driving mechanism and a scraper, and the movement driving mechanism can drive the scraper to move on the bearing groove and the scraping plate so as to scrape slurry into the molding cylinder.

The scanning assembly is arranged over the molding cylinder and can scan and cure the slurry on the molding cylinder according to a preset pattern.

The spray assembly includes an atomizing box for atomizing a liquid, and a first spray pipe and a second spray pipe that communicate with the atomizing box. An outlet of the first spray pipe leads to the storage hopper. The feeding rod includes a gas distribution pipe and a feeding pipe arranged at a middle portion of the gas distribution pipe. The output end of the feeding pump communicates with an upper end of the feeding pipe, and a lower end of the feeding pipe faces the bearing groove. A gas inlet is provided in the gas distribution pipe, and the second spray pipe communicates with the gas inlet. A gas distribution cavity running through two ends of the gas distribution pipe is provided in the gas distribution pipe, and the gas inlet communicates with the feeding pipe through the gas distribution cavity.

As an improvement of the above solution, the ceramic 3D printing device based on a gel molding process further includes a pressure rod assembly, where the pressure rod assembly includes intermediate pressure rods, the intermediate pressure rods are arranged on two sides of an upper surface of the scraping plate, the intermediate pressure rod is provided therein with an intermediate cavity, a middle portion of the intermediate pressure rod is provided with an intermediate through hole communicating with the intermediate cavity, the intermediate through hole faces the molding cylinder, an end portion of the gas distribution pipe is provided with a gas distribution port communicating with the gas distribution cavity, ends of two intermediate cavities communicate with the gas distribution ports at two ends of the gas distribution pipe respectively, and the other ends of the two intermediate cavities each are provided with an exhaust port.

As an improvement of the above solution, the pressure rod assembly further includes a rear pressure rod, the rear pressure rod is arranged at one end of the intermediate pressure rod away from the feeding rod, side portions of two ends of the rear pressure rod communicate with the exhaust ports respectively, the rear pressure rod is provided therein with a rear cavity with two through ends, the rear cavity communicates with the intermediate cavity through the exhaust port, air blowing members are arranged at two ends of the rear cavity respectively, a side portion of the rear pressure rod is further provided with a rear through hole communicating with the rear cavity, the rear through hole faces away from the scraping plate, and an air outlet of each air blowing member faces the rear through hole.

As an improvement of the above solution, the receiving assembly further includes a gas distribution mechanism, the gas distribution mechanism includes sliding holes provided in a side portion of the gas distribution pipe and communicating with the gas distribution cavity, two sliding holes and two gas inlets are provided and communicate with each other, and the sliding hole is provided between the gas distribution port and the feeding pipe; the gas distribution mechanism further includes a telescopic driving member and a reversing member in transmission connection with the telescopic driving member, the reversing member can be inserted into the sliding hole, and the telescopic driving member can drive the reversing member to slide in the sliding hole toward the gas distribution port or the feeding pipe, such that the gas inlet communicates with the feeding pipe and/or the gas distribution port.

As an improvement of the above solution, the side portion of the gas distribution pipe is provided with a sliding groove, the sliding hole is provided in the sliding groove, the reversing member includes a sealing plate and a moving plate, the moving plate is vertically fixed to a middle portion of the sealing plate, the moving plate can be inserted into the sliding hole, the sealing plate can move in the sliding groove, the sealing plate is connected to the telescopic driving member, the moving plate is perpendicular to a length direction of the gas distribution cavity, the moving plate can move in the sliding hole, and the sealing plate can keep sealing the sliding hole when the moving plate moves.

As an improvement of the above solution, the ceramic 3D printing device based on a gel molding process further includes a humidity sensing assembly, where the humidity sensing assembly includes a storage sensing member, a feeding sensing member, and a molding sensing member; and the storage sensing member, the feeding sensing member, and the molding sensing member are arranged above the storage hopper, the feeding rod, and the intermediate through hole respectively.

The present disclosure further provides a control method, used for controlling the ceramic 3D printing device based on a gel molding process as described above, and including the following steps:

a) starting the atomizing box to atomize a liquid, and introducing the atomized liquid into the storage hopper and the bearing groove through the first spray pipe and the second spray pipe respectively;
b) driving the feeding pump to extract slurry from the storage hopper and introducing the slurry into the feeding rod;
c) driving the scraper to move on the bearing groove and the scraping plate so as to scrape the slurry into the molding cylinder;
d) driving the scanning assembly to scan and cure the slurry on the molding cylinder according to a preset pattern;
e) driving the lifting plate to descend by a preset height;
f) repeating steps c-e until a three-dimensional model is obtained; and
g) taking out the three-dimensional model, cleaning with water or alcohol, and obtaining a sample after gel discharging and sintering;

where, during the above process, humidity values of an area in which the storage hopper is located and an area in which the bearing groove is located are detected in real time, each humidity value is compared with a preset humidity parameter range, and if the humidity value is not within the preset humidity parameter range, flow rates of the first spray pipe and/or the second spray pipe are adjusted to make the humidity value falls within the preset humidity parameter range.

As an improvement of the above solution, the humidity values of the area in which the storage hopper is located and the area in which the bearing groove is located that are detected in real time are set to R1 and R2, and the preset humidity parameter ranges of the area in which the storage hopper is located and the area in which the bearing groove is located are R01 and R02; and the step of adjusting flow rates of the first spray pipe and/or the second spray pipe to make the humidity value falls within the preset humidity parameter range includes:

when R1 is greater than a maximum value of R01, reducing the flow rate of the first spray pipe; or when R1 is less than a minimum value of R01, increasing the flow rate of the first spray pipe; and when R2 is greater than a maximum value of R02, reducing the flow rate of the second spray pipe; or when R2 is less than a minimum value of R02, increasing the flow rate of the second spray pipe.

As an improvement of the above solution, a humidity value of an area in which the molding cylinder is located, which is detected in real time, is R3, and a preset humidity parameter range of the area in which the molding cylinder is located is R03.

The method further includes the following steps:

when R2 is greater than the maximum value of R02 and R3 is greater than a maximum value of R03, reducing the flow rate of the second spray pipe; or when R2 is greater than the maximum value of R02 and R3 is in the range of R03 or R3 is less than a minimum value of R03, starting the telescopic driving member to drive the reversing member to slide toward the feeding pipe by a distance of L1, so as to increase a distance between the moving plate and the gas distribution port and reduce a distance between the moving plate and the feeding pipe; or when R2 is less than the minimum value of R02 and R3 is greater than the maximum value of R03, starting the telescopic driving member to drive the reversing member to slide toward the gas distribution port by a distance of L2, so as to reduce the distance between the moving plate and the gas distribution port and increase the distance between the moving plate and the feeding pipe; or when R2 is less than the minimum value of R02 and R3 is in the range of R03 or R3 is less than the minimum value of R03, increasing the flow rate of the second spray pipe.

As an improvement of the above solution, the method further includes the following steps:

when R3 is greater than the maximum value of R03 and R2 is in the range of R02, starting the telescopic driving member to drive the reversing member to slide toward the gas distribution port by a distance of L3, so as to reduce the distance between the moving plate and the gas distribution port and increase the distance between the moving plate and the feeding pipe, and/or starting the air blowing member to create a negative pressure in the rear cavity, so as to discharge the atomized liquid in the area in which the molding cylinder is located to the rear through hole through the intermediate through hole, the intermediate cavity, and the exhaust port; or when R3 is less than the minimum value of R03 and R2 is in the range of R02, increasing the flow rate of the second spray pipe, and/or driving the telescopic driving member to drive the reversing member to slide toward the feeding pipe by a distance of L4, so as to increase a distance between the moving plate and the gas distribution port and reduce a distance between the moving plate and the feeding pipe.

The present disclosure has the following beneficial effects:

The ceramic 3D printing device based on a gel molding process according to the present disclosure is provided with a feeding assembly, a receiving assembly, a scraping assembly, a bearing assembly, a scanning assembly, and a spray assembly, where the feeding assembly includes a feeding pump and a storage hopper. Slurry is stored in the storage hopper. The receiving assembly includes a feeding rod. The feeding pump can convey the slurry in the storage hopper to the feeding rod. The bearing assembly includes a bearing groove and a scraping plate. The feeding rod places the received slurry into the bearing groove, and the scraping assembly scrapes the slurry into a molding cylinder of the scraping plate layer by layer. The scanning assembly scans and cures and molds the slurry on the molding cylinder according to a preset pattern. In this process, an atomizing box of the spray assembly can manufacture an atomized liquid, a first spray pipe can lead the atomized liquid into the storage hopper, and a second spray pipe can lead the atomized liquid to a bearing groove through a feeding pipe, so as to keep a water content of the slurry in the storage hopper and the bearing groove, and prevent a gelling agent from coagulating in advance, which otherwise affects subsequent curing and molding. Moreover, by controlling spray flow rates of the first spray pipe and the second spray pipe, the water content in the slurry can be accurately controlled, and a refraction effect and a scattering effect caused by water mist generated due to a too high water content can be prevented. During molding, the water may be volatilized normally, so that the gelling agent is coagulated normally, and the strength of a cured layer is increased, thereby increasing the strength of a green body and achieving a better molding effect.

DETAILED DESCRIPTION

In order to make the objectives, technical solutions, and advantages of the present disclosure clearer, the present disclosure will be further described in detail below with reference to the accompanying drawings. It is only stated that the directional words such as "up", "down", "left", "right", "front", "back", "inner", and "outer" that appear or will appear herein in the present disclosure are only based on the accompanying drawings of the present disclosure, and are not specific limitations to the present disclosure.

Figure 1:
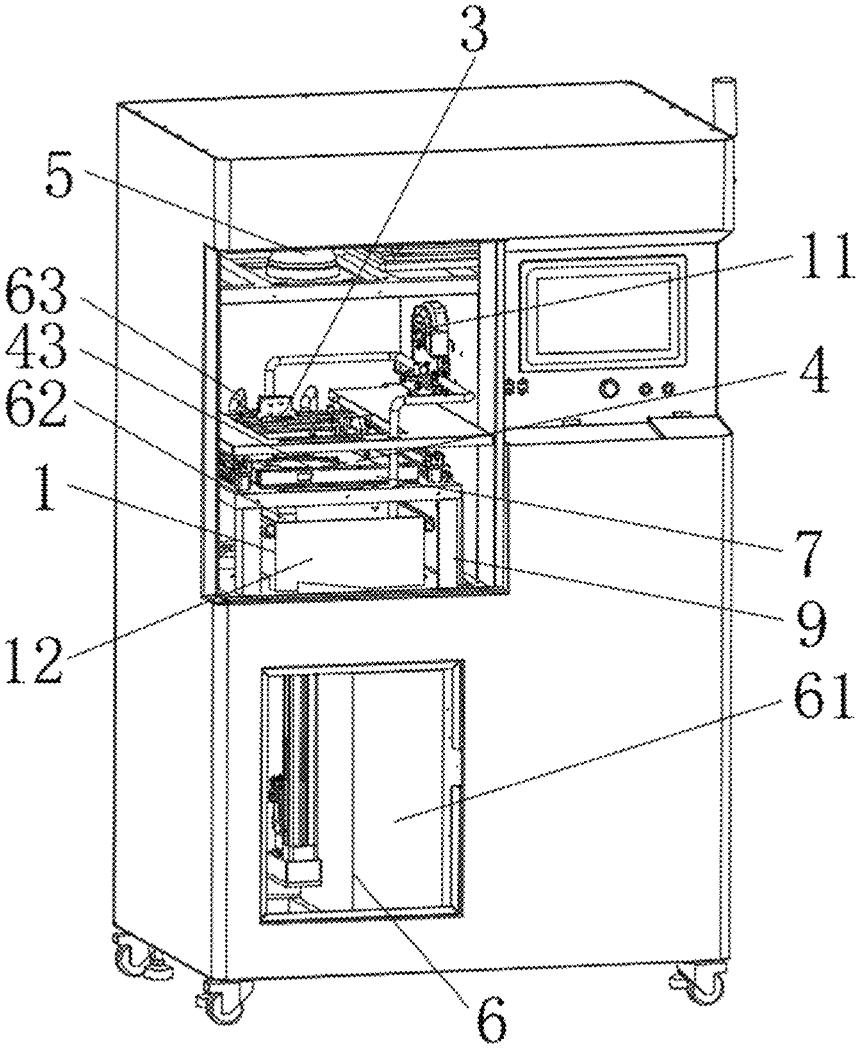
FIG. 1 is a schematic structural diagram of a ceramic 3D printing device based on a gel molding process according to the present disclosure.
Figure 2:
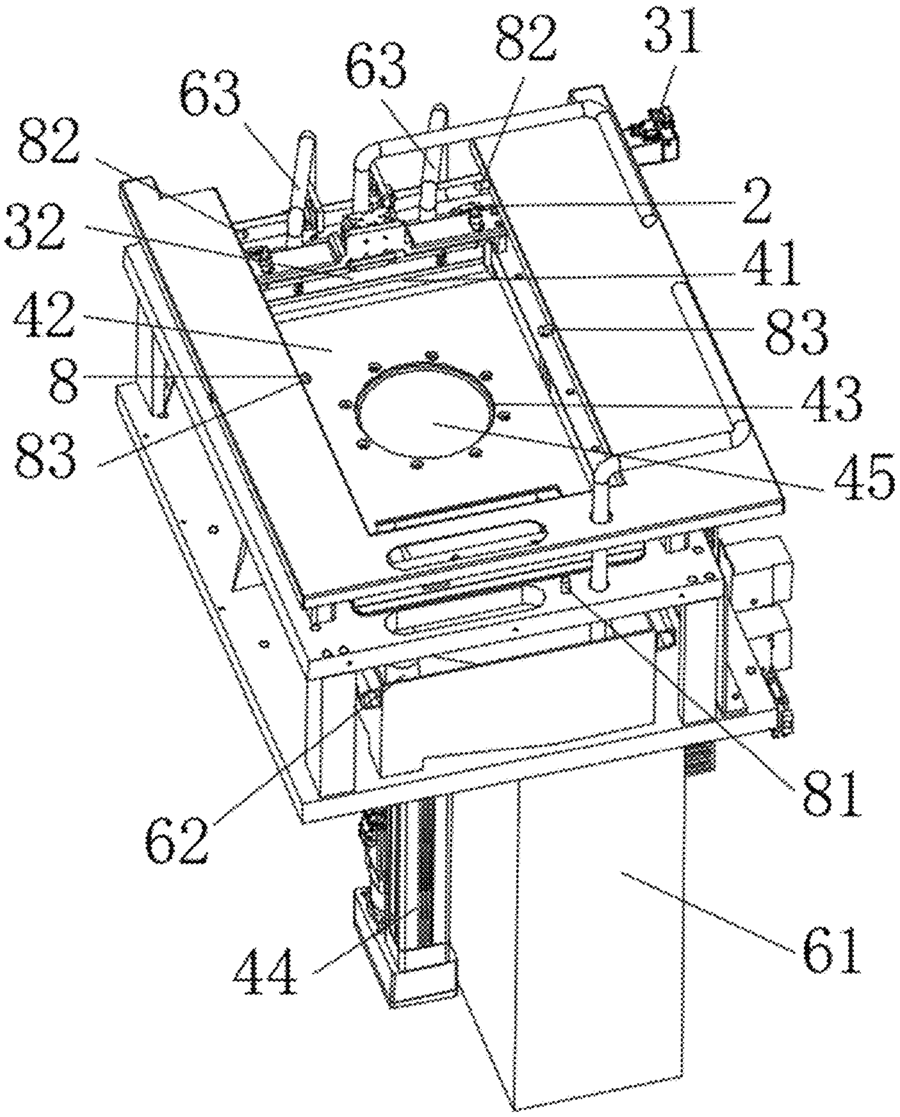
FIG. 2 is a schematic structural diagram of a receiving assembly, a scraping assembly, a bearing assembly, a spray assembly, a pressure rod assembly, and a humidity sensing assembly according to the present disclosure.

Referring to FIGS. 1 and 2, an embodiment of the present disclosure discloses a ceramic 3D printing device based on a gel molding process, including a frame 9, and a feeding assembly 1, a receiving assembly 2, a scraping assembly 3, a bearing assembly 4, a scanning assembly 5 and a spray assembly 6 that are arranged on the frame 9. A plurality of cavities are formed in a box body. The frame 9 is configured to fix other components. The feeding assembly 1 is configured to store and supply slurry. The receiving assembly 2 is configured to receive the slurry from the feeding assembly 1. The scraping assembly 3 is configured to convey the slurry in the receiving assembly 2 to the bearing assembly 4. The scanning assembly 5 is configured to scan, cure and mold the slurry on the bearing assembly 4. The spray assembly 6 is configured to replenish water to the slurry to control a water content of the slurry. The feeding assembly 1 includes a feeding pump 11 and a storage hopper 12. An input end of the feeding pump 11 communicates with the storage hopper 12, and the slurry is stored in the storage hopper 12. The receiving assembly 2 includes a feeding rod 21, and an output end of the feeding pump 11 communicates with the feeding rod 21. The feeding pump 11 can convey the slurry from the storage hopper 12 to the feeding rod 21.

The bearing assembly 4 includes a bearing groove 41, a scraping plate 42, a molding cylinder 43 provided on the scraping plate 42, a lifting plate 45 arranged at a bottom of the molding cylinder 43, and a lifting driving member 44 in transmission connection with the lifting plate. The lifting plate 45 is arranged in the molding cylinder 43. A movable end of the lifting driving member 44 is connected to a bottom of the lifting plate 45, and the lifting driving member 44 can drive the lifting plate 45 to ascend and descend in the molding cylinder 43. An outlet of the feeding rod 21 leads to the bearing groove 41. The feeding pump 11 feeds the slurry into the bearing groove 41 through the feeding rod 21, and the bearing groove 41 can temporarily store part of the slurry for cyclic scraping by the scraping assembly 3. The bearing groove 41 is connected to the scraping plate 42. The scraping assembly 3 includes a movement driving mechanism 31 and a scraper 32. The movement driving mechanism 31 can drive the scraper 32 to move on the bearing groove 41 and the scraping plate 42. The movement driving mechanism 31 firstly drives the scraper 32 to scrape the slurry in the bearing groove 41 onto the scraping plate 42, and then scrapes the slurry out along the scraping plate 42 until the slurry is scraped into the molding cylinder 43. The slurry can be cured and molded in the molding cylinder 43. The scanning assembly 5 is arranged over the molding cylinder 43 and can scan and cure the slurry on the molding cylinder 43 according to a preset pattern. An action principle of the scanning assembly 5 is similar to that of a photocuring device in the prior art, and details are not described herein. The receiving assembly 2, the scraping assembly 3, the bearing assembly 4, and the scanning assembly 5 are located in the molding cavity. During use, the scraper 32 scrapes the slurry onto the scraping plate 42. When the slurry passes through an upper opening of the molding cylinder 43, the slurry remains in the molding cylinder 43 and forms a slurry layer in the lifting plate 45. Then the scanning assembly 5 scans the slurry according to the preset pattern and cures the slurry. After one layer is cured, the lifting driving member 44 drives the lifting plate 45 to move downward by a certain distance to accommodate a next layer of slurry, and then the scraping assembly 3 and the scanning assembly 5 repeat the above steps to complete the curing of the next layer.

It should be noted that in the embodiment of the present disclosure, the slurry used is water-based slurry, and a gelling agent is added. During laser curing, the water content in the slurry is reduced, and the gelling agent is converted from a dispersed state to a gel state. The gel converted into the gel state improves the strength of the cured layer, thereby improving the strength of a green body, increasing the gel discharging and sintering speed, and shortening the time for gel discharging and sintering. Since the slurry is subjected to water volatilization during storage and transfer, and the water volatilization will lead to a change in a state of the gelling agent, it is necessary to control the water content of the gelling agent in this process to prevent the gelling agent from converting into a gel state in advance during feeding and receiving, and also to prevent obvious refraction and scattering effects caused by excessive water mist during molding. In order to control the water content of the slurry, the spray assembly 6 includes an atomizing box 61 for atomizing a liquid, and a first spray pipe 62 and a second spray pipe 63 that communicate with the atomizing box 61. An outlet of the first spray pipe 62 leads to the storage hopper 12, and an outlet of the second spray pipe 63 can lead to the bearing groove 41. An atomizing unit and a corresponding liquid are provided in the atomizing box 61. In the embodiment of the disclosure, the corresponding liquid is water, and the atomizing unit can atomize the liquid. The atomized liquid is driven into the first spray pipe 62 and the second spray pipe 63 by a fan and other elements. The first spray pipe 62 can introduce the atomized liquid into the storage hopper 12, and the second spray pipe 63 can introduce the atomized liquid into the bearing groove 41. Therefore, the water volatilized from the slurry before curing can be replenished, and by controlling the flow rates of the atomized liquid introduced into the first spray pipe 62 and the second spray pipe 63, speeds of replenishing water in the storage hopper 12 and the bearing groove 41 can be controlled respectively, so as to prevent excessive water addition from affecting subsequent laser curing and molding.

Figure 3:
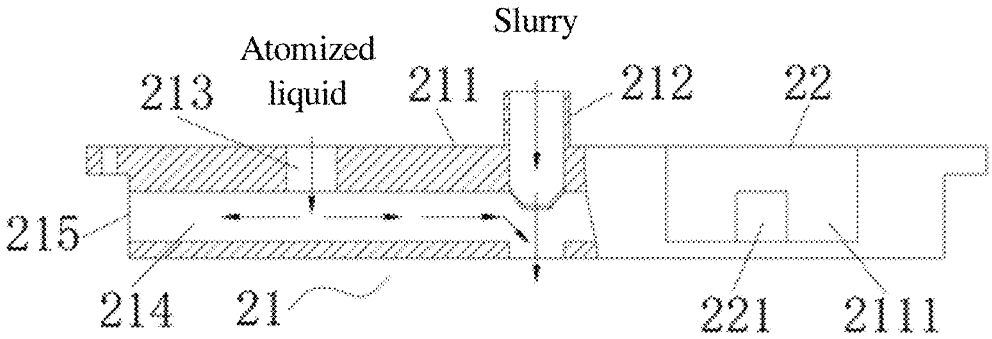
FIG. 3 is a schematic diagram of a partial cross-sectional structure of a feeding rod according to the present disclosure.

Referring to FIG. 3, the feeding rod 21 includes a gas distribution pipe 211 and a feeding pipe 212 arranged at a middle portion of the gas distribution pipe 211. The gas distribution pipe 211 and the feeding pipe 212 are perpendicular to each other. The feeding pipe 212 is vertically arranged. The output end of the feeding pump 11 communicates with an upper end of the feeding pipe 212, and a lower end of the feeding pipe 212 faces the bearing groove 41, Therefore, the slurry can be introduced into the bearing groove 41 through the feeding pipe 212, and the bearing groove 41 achieves an effect of buffer storage, which enables the feeding pump 11 to supply the slurry quickly, but also ensures that the scraping assembly 3 can scrape enough slurry when circulating back and forth, thereby improving the molding efficiency of each layer of slurry. At the same time, in order to fully mix the atomized liquid with the slurry, a gas inlet 213 is provided in the gas distribution pipe 211, and the second spray pipe 63 communicates with the gas inlet 213, so that the atomized liquid can be introduced into the gas inlet 213. The gas inlet 213 communicates with the feeding pipe 212, so the atomized liquid can be mixed with the slurry in the feeding pipe 212, and since there is less ventilation space between the gas inlet 213 and the feeding pipe 212, contact between the atomized liquid and the slurry can be promoted. Therefore, there is less atomized liquid that is not absorbed by the slurry, and even if the less atomized liquid overflows from the feeding port, there is no great impact on the overall humidity of the molding cavity.

The gas distribution pipe 211 is arranged in a length direction of the bearing groove 41, and a gas distribution cavity 214 is provided in the gas distribution pipe 211. The gas distribution cavity 214 runs through two ends of the gas distribution pipe 211. Two gas inlets 213 are provided, and are arranged on two opposite sides of the feeding pipe 212. The atomized liquid enters the gas distribution cavity 214 after being introduced, and the gas inlets 213 communicate with the feeding pipe 212 through the gas distribution cavity 214, so that the atomized liquid can be introduced into the feeding pipe 212.

Embodiments of the present disclosure have the following beneficial effects:

The ceramic 3D printing device based on a gel molding process according to the embodiments of the present disclosure is provided with a feeding assembly 1, a receiving assembly 2, a scraping assembly 3, a bearing assembly 4, a scanning assembly 5, and a spray assembly 6, where the feeding assembly 1 includes a feeding pump 11 and a storage hopper 12. Slurry is stored in the storage hopper 12. The receiving assembly 2 includes a feeding rod 21. The feeding pump 11 can convey the slurry in the storage hopper 12 to the feeding rod 21. The bearing assembly 4 includes a bearing groove 41 and a scraping plate 42. The feeding rod 21 places the received slurry into the bearing groove 41, and the scraping assembly 3 scrapes the slurry into a molding cylinder 43 of the scraping plate 42 layer by layer. The scanning assembly 5 scans and cures and molds the slurry on the molding cylinder 43 according to a preset pattern. In this process, an atomizing box 61 of the spray assembly 6 can manufacture an atomized liquid, a first spray pipe 62 can lead the atomized liquid into the storage hopper 12, and a second spray pipe 63 can lead the atomized liquid to a bearing groove 41 through a feeding pipe 212, so as to keep a water content of the slurry in the storage hopper 12 and the bearing groove 41, and prevent a gelling agent from coagulating in advance, which otherwise affects subsequent curing and molding. Moreover, by controlling spray flow rates of the first spray pipe 62 and the second spray pipe 63, the water content in the slurry can be accurately controlled, and a refraction effect and a scattering effect caused by water mist generated due to a too high water content can be prevented. During molding, the water may be volatilized normally, so that the gelling agent is coagulated normally, and the strength of a cured layer is increased, thereby increasing the strength of a green body and achieving a better molding effect.

Figure 4:
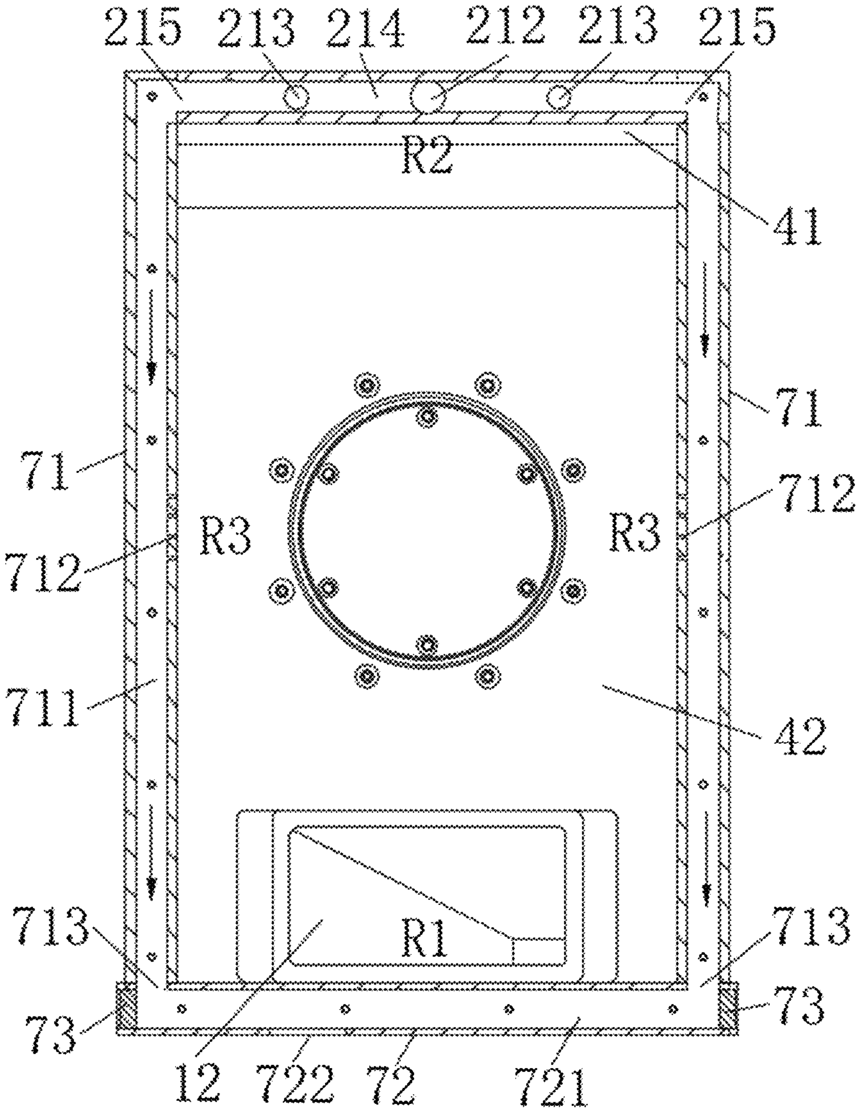
FIG. 4 is a schematic diagram of a cross-sectional structure of a receiving assembly and a pressure rod assembly according to the present disclosure.

Specifically, referring to FIG. 4, in order to finely control the humidity of each part of the molding cavity, the ceramic 3D printing device based on a gel molding process further includes a pressure rod assembly 7. The pressure rod assembly 7 includes two intermediate pressure rods 71, and the intermediate pressure rods 71 are arranged on two sides of the scraping plate 42 respectively. The intermediate pressure rod 71 extends in a direction close to the storage hopper 12. The feeding rod 21 is arranged on a side of the scraping plate 42 away from the storage hopper 12, and the gas distribution cavity 214 can communicate with the intermediate pressure rod 71. Specifically, the intermediate pressure rod 71 is provided therein with an intermediate cavity 711, and two ends of the gas distribution pipe 211 are provided with gas distribution ports 215 communicating with the gas distribution cavity 214. Ends of two intermediate cavities 711 communicate with the gas distribution ports 215 at the two ends of the gas distribution pipe 211 respectively, and therefore the atomized liquid in the gas distribution cavities 214 can enter the intermediate cavities 711 through the gas distribution ports 215. A middle portion of the intermediate pressure rod 71 is provided with an intermediate through hole 712 communicating with the intermediate cavity 711, and the intermediate through hole 712 faces the molding cylinder 43. Therefore, when the humidity of an area in which the molding cylinder 43 is located is less than a preset level, in order to prevent the gelling agent of the slurry in the molding cylinder 43 from coagulating in advance, or to adjust the humidity level of the area in which the molding cylinder 43 is located to obtain green bodies with different coagulation parameters, the intermediate cavity 711 can spray, through the intermediate through hole 712, the atomized liquid to the area in which the molding cylinder 43 is located, thereby controlling the humidity level of the area in which the molding cylinder 43 is located. Further, if the humidity in the area in which the molding cylinder 43 is located is too high and the slurry absorbs too much water, unstable slurry properties are easily caused, thus affecting precision of curing and molding. In order to prevent the humidity from being too high, the other ends of the two intermediate cavities 711 (the ends away from the gas distribution ports 215) each are provided with an exhaust port 713. The exhaust port 713 can absorb the atomized liquid in the area in which the molding cylinder 43 is located through the intermediate through hole 712, thereby reducing the humidity in the area in which the molding cylinder 43 is located, thus implementing adjustable humidity in the area in which the molding cylinder 43 is located.

In addition, referring to FIG. 4, the pressure rod assembly 7 further includes a rear pressure rod 72, and the rear pressure rod 72 is arranged at one end of the intermediate pressure rod 71 away from the feeding rod 21, that is, on one side opposite to the feeding rod 21. Side portions of two ends of the rear pressure rod 72 communicate with the exhaust ports 713 of the two intermediate cavities 711 respectively, and the rear pressure rod 72 is provided therein with a rear cavity 721 with two through ends. The rear cavity 721 communicates with the intermediate cavity 711 through the exhaust port 713. A side portion of the rear pressure rod 72 is further provided with a rear through hole 722 communicating with the rear cavity 721. The excess atomized liquid discharged from the exhaust port 713 can enter the rear cavity 721 and is ultimately discharged from the rear through hole 722. The rear through hole 722 faces away from the scraping plate 42, which can prevent the discharged atomized liquid from returning to the area in which the molding cylinder 43 is located.

In order to facilitate the discharge of the atomized liquid from the exhaust port 713, air blowing members 73 are arranged at two ends of the rear cavity 721 respectively. An air outlet of each air blowing member 73 faces the rear through hole 722, and the air blowing member 73 is arranged on a side portion of the exhaust port 713. A blowing direction of the air blowing member 73 is perpendicular to a direction in which the intermediate cavity 711 is provided. The air blowing member 73 is preferably a small fan, which can blow outside air into the rear cavity 721. During blowing by the air blowing member 73, a negative pressure is formed at the exhaust port 713, thus creating a negative pressure in the intermediate cavity 711. By closing the gas distribution port 215 at the other end of the intermediate cavity 711, the intermediate through hole 712 sucks the atomized liquid from the area in which the molding cylinder 43 is located, thereby reducing a concentration of the atomized liquid in the area in which the molding cylinder 43 is located, and further reducing the humidity in this area. The air blowing member 73 is arranged in the rear pressure rod 72 instead of the intermediate pressure rod 71, and the blowing direction of the air blowing member 73 is perpendicular to the direction in which the intermediate cavity 711 is provided, so that the atomized liquid in the intermediate cavity 711 is introduced into the rear cavity 721 by creating a negative pressure. This can prevent the air blowing member 73 from being in direct contact with the atomized liquid, and prolong the service life of the air blowing member 73. Moreover, the air blowing members 73 are arranged at two ends of the rear cavity 721, and one side of each air blowing member 73 is exposed outside the rear pressure rod 72, which facilitates air intake, maintenance and replacement.

Figure 5:
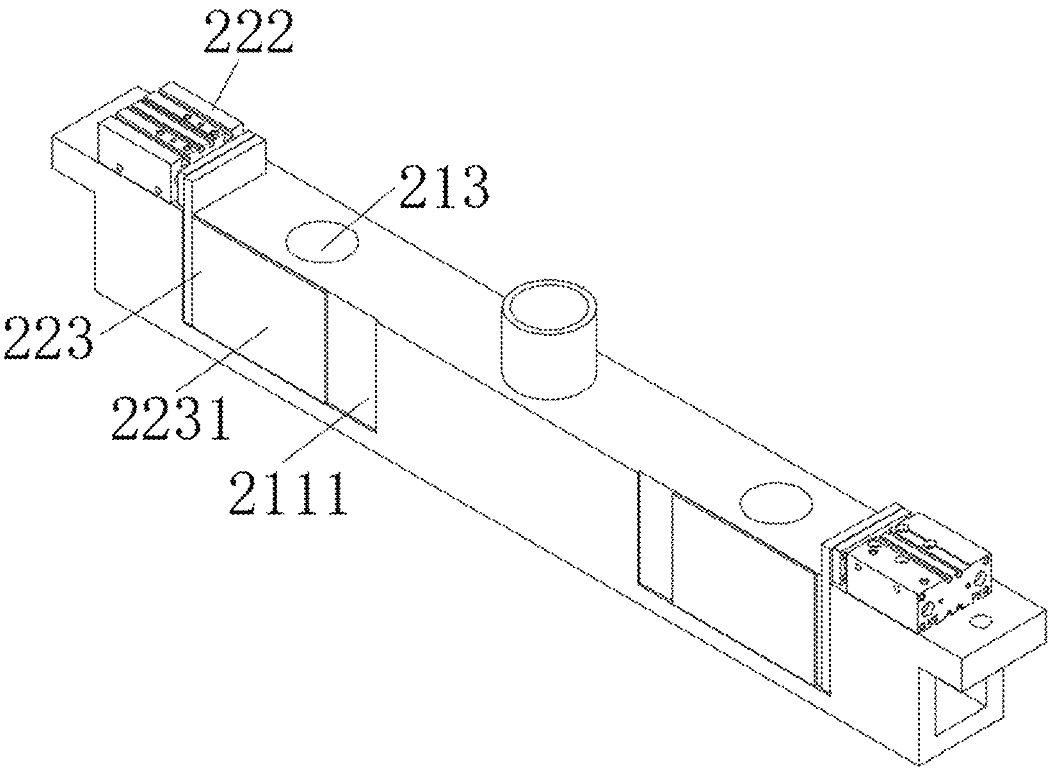
FIG. 5 is a schematic structural diagram of a feeding rod and a gas distribution mechanism according to the present disclosure.

Referring to FIG. 5, in order to facilitate the closing of the gas distribution port 215, the receiving assembly 2 further includes a gas distribution mechanism 22. The gas distribution mechanism 22 includes two sliding holes 221 provided in a side portion of the gas distribution pipe 211 and communicating with the gas distribution cavity 214. The sliding holes 221 communicate with two gas inlets 213 respectively. Two ends of the gas distribution pipe 211 each are provided with a gas distribution port 215 communicating with the gas distribution cavity 214. The sliding hole 221 is provided between the gas distribution port 215 and the feeding pipe 212. The gas distribution mechanism 22 further includes a telescopic driving member 222 and a reversing member 223 in transmission connection with the telescopic driving member 222. The reversing member 223 can be inserted into the sliding hole 221, and the sliding hole 221 provides a space for movement of the reversing member 223. The telescopic driving member 222 can drive the reversing member 223 to slide in the sliding hole 221 toward the gas distribution port 215 or the feeding pipe 212, such that the gas inlet 213 communicates with the feeding pipe 212 and/or the gas distribution port 215.

Figure 6:
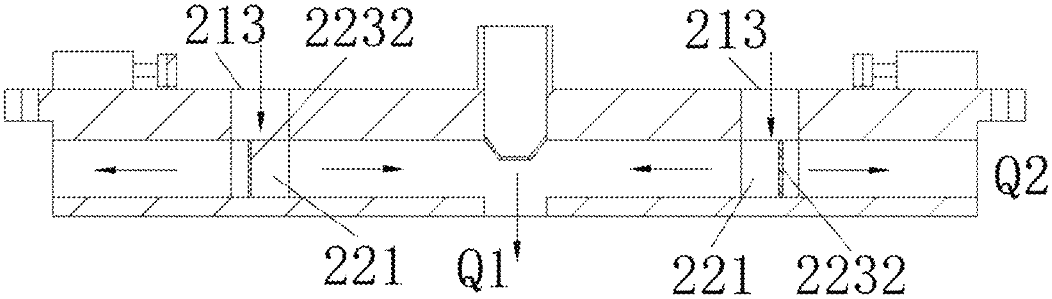
FIG. 6 is a schematic diagram showing a first state of a feeding rod and a gas distribution mechanism according to the present disclosure.
Figure 7:
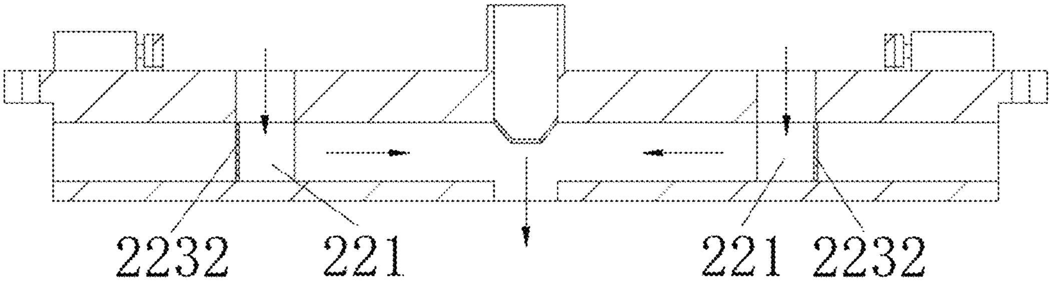
FIG. 7 is a schematic diagram showing a second state of a feeding rod and a gas distribution mechanism according to the present disclosure.
Figure 8:
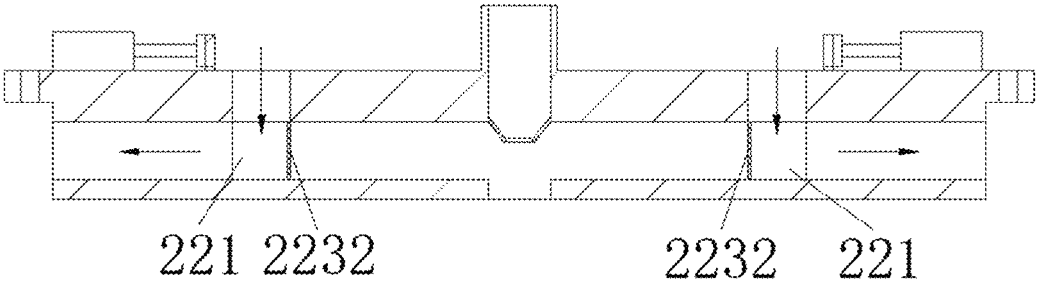
FIG. 8 is a schematic diagram showing a third state of a feeding rod and a gas distribution mechanism according to the present disclosure.

Specifically, referring to FIG. 7, when the reversing member 223 moves to the end toward the gas distribution port 215, a part of the reversing member 223 that is located in the gas distribution cavity 214 disenables the communication between the gas distribution port 215 and the gas distribution cavity 214, so that the gas inlet 213 can only communicate with the feeding pipe 212. At this time, the slurry in the feeding pipe 212 can obtain more atomized liquid, while no atomized liquid is obtained in the area in which the molding cylinder 43 is located. Referring to FIG. 8, when the reversing member 223 moves to the end toward the feeding pipe 212, a part of the reversing member 223 that is located in the gas distribution cavity 214 disenables the communication between the feeding pipe 212 and the gas distribution cavity 214, so that the gas inlet 213 can only communicate with the gas distribution port 215, and the atomized liquid can only enter the area in which the molding cylinder 43 is located, so as to replenish the liquid to the slurry in molding. Referring to FIG. 6, when the reversing member 223 is located between the feeding pipe 212 and the gas distribution port 215 and does not move to the end of either end, the atomized liquid can enter the feeding pipe 212 and the intermediate cavity 711 at the same time. Moreover, by controlling the position of the reversing member 223 by means of the telescopic driving member 222, the ratio of atomized liquids introduced into the feeding pipe 212 and the intermediate cavity 711 can be controlled, so that more accurate humidity adjustment between different areas can be implemented.

Further, referring to FIG. 5, a side portion of the gas distribution pipe 211 is provided with a sliding groove 2111, the sliding hole 221 is provided in the sliding groove 2111. The reversing member 223 includes a sealing plate 2231 and a moving plate 2232. The moving plate 2232 is vertically fixed to a middle portion of the sealing plate 2231. The moving plate 2232 and the sealing plate 2231 form a T shape, and the moving plate 2232 can be inserted into the sliding hole 221. The sealing plate 2231 can move in the sliding groove 2111, and the sliding groove 2111 provides a sliding space for the sealing plate 2231. The sealing plate 2231 is connected to the telescopic driving member 222, and the moving plate 2232 can move in the sliding hole 221. The sealing plate 2231 is parallel to a length direction of the sliding hole 221. The moving plate 2232 is perpendicular to a length direction of the gas distribution cavity 214, and can block, when moving to the end, a position where the gas distribution port 215 or the feeding pipe 212 communicates with the gas distribution cavity 214. When the moving plate 2232 moves, the sealing plate 2231 can be attached to the sliding groove 2111 and keep the sealing of the sliding hole 221, thus preventing the atomized liquid from leaking.

In order to accurately control the humidity of each area in the molding cavity, the ceramic 3D printing device based on a gel molding process further includes a humidity sensing assembly 8. The humidity sensing assembly 8 includes a storage sensing member 81, a feeding sensing member 82, and a molding sensing member 83. The storage sensing member 81, the feeding sensing member 82, and the molding sensing member 83 are arranged above the storage hopper 12, the feeding rod 21, and the intermediate through hole 712 respectively. The storage sensing member 81, the feeding sensing member 82 and the molding sensing member 83 can sense the humidity in the area in which the storage hopper 12 is located, the humidity in the area in which the feeding rod 21 is located and the humidity in the area in which the molding cylinder 43 is located respectively, so as to accurately adjust and control the humidity in each area according to a preset humidity level, thereby achieving a better molding effect.

Figure 9:
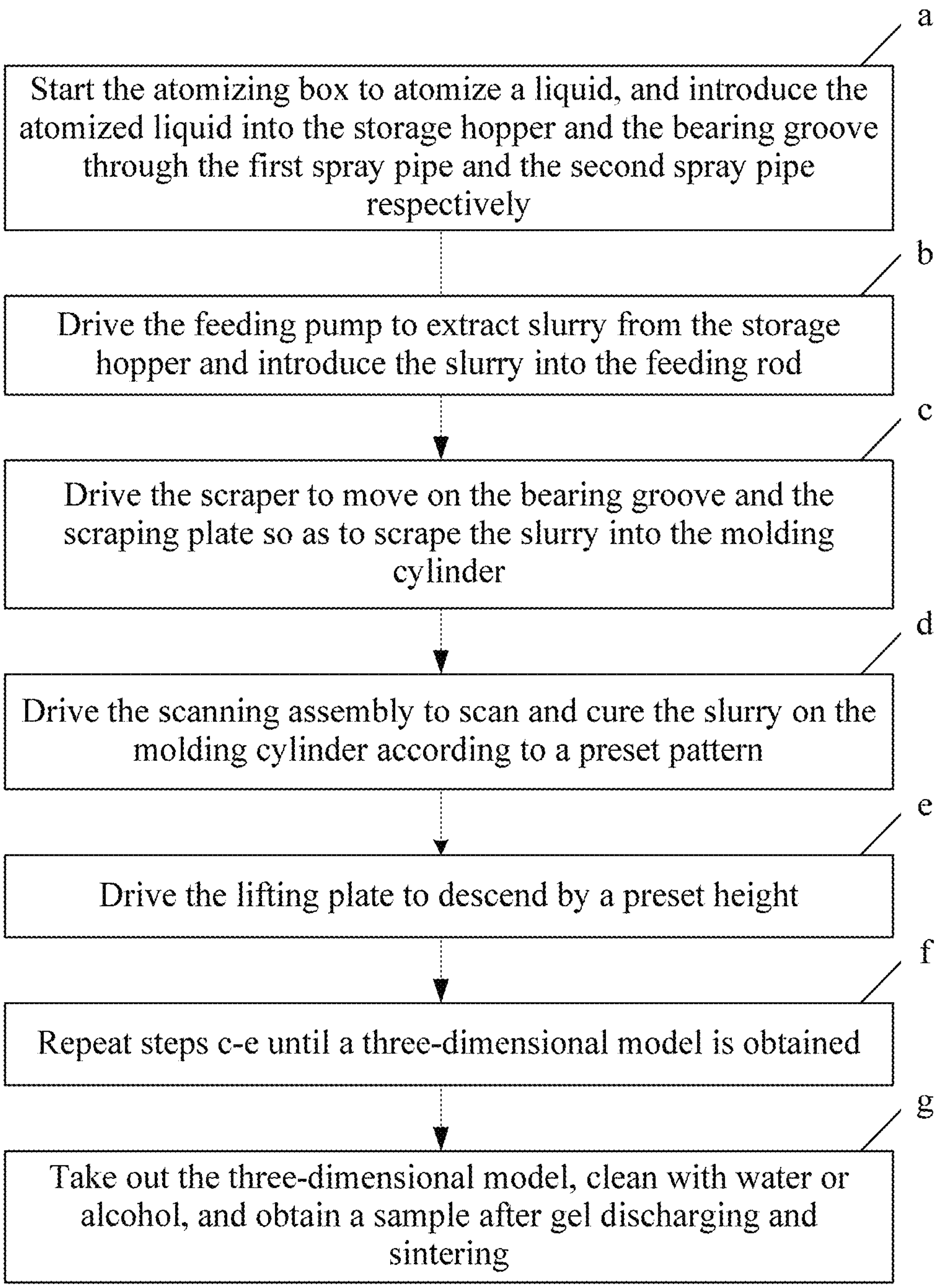
FIG. 9 is a schematic flowchart of a control method according to the present disclosure.

Referring to FIG. 9, an embodiment of the present disclosure further discloses a control method, used for controlling the ceramic 3D printing device based on a gel molding process as described above, and including the following steps.

a) Start the atomizing box 61 to atomize a liquid, and introduce the atomized liquid into the storage hopper 12 and the bearing groove 41 through the first spray pipe 62 and the second spray pipe 63 respectively.
b) Drive the feeding pump 11 to extract slurry from the storage hopper 12 and introduce the slurry into the feeding rod 21.
c) Drive the scraper 32 to move on the bearing groove 41 and the scraping plate 42 so as to scrape the slurry into the molding cylinder 43.
d) Drive the scanning assembly 5 to scan and cure the slurry on the molding cylinder 43 according to a preset pattern.
e) Drive the lifting plate 45 to descend by a preset height.
f) Repeat steps c-e until a three-dimensional model is obtained.
g) Take out the three-dimensional model, clean with water or alcohol, and obtain a sample after gel discharging and sintering.

During the above process, humidity values of an area in which the storage hopper 12 is located and an area in which the bearing groove 41 is located are detected in real time by the storage sensing member 81 and the feeding sensing member 82 respectively, each humidity value is compared with a preset humidity parameter range, and if the humidity value is not within the preset humidity parameter range, flow rates of the first spray pipe 62 and/or the second spray pipe 63 are adjusted to make the humidity value falls within the preset humidity parameter range.

It should be noted that steps b-g need to be performed in sequence, while step a may be set before step b or after step c or between step b and step c. The storage sensing member 81 and the feeding sensing member 82 are both humidity sensors. The storage sensing member 81 can detect the humidity value of the area in which the storage hopper 12 is located, and the feeding sensing member 82 can detect the humidity value of the area in which the bearing groove 41 is located. By detecting the humidity values of the two areas, feedback parameters can be provided for humidity conditions of each area. The preset humidity parameter range is a range value, which can allow the humidity of each area to be within a range. The first spray pipe 62 and the second spray pipe 63 can independently adjust flow rates, so the humidity value of the area in which the storage hopper 12 is located and the humidity value of the area in which the bearing groove 41 is located can be controlled within a reasonable range by the first spray pipe 62 and the second spray pipe 63 respectively.

By detecting the humidity value of each area and regulating the flow rates of the atomized liquid in the first spray pipe 62 and the second spray pipe 63, the humidity value of each area can be controlled within the preset humidity parameter range, so that the slurry can be prevented from absorbing too much water due to a too high humidity or volatilizing too much due to an insufficient humidity, and the stability of slurry properties can be ensured, thus ensuring the stable function of the gelling agent.

Further, the humidity values of the area in which the storage hopper 12 is located and the area in which the bearing groove 41 is located that are detected in real time are set to R1 and R2, and the preset humidity parameter ranges of the area in which the storage hopper 12 is located and the area in which the bearing groove 41 is located are R01 and R02; and the step of adjusting flow rates of the first spray pipe 62 and/or the second spray pipe 63 to make the humidity value falls within the preset humidity parameter range includes:

when R1 is greater than a maximum value of R01, reducing the flow rate of the first spray pipe 62; or
when R1 is less than a minimum value of R01, increasing the flow rate of the first spray pipe 62; and
when R2 is greater than a maximum value of R02, reducing the flow rate of the second spray pipe 63; or when R2 is less than a minimum value of R02, increasing the flow rate of the second spray pipe 63.

By reducing or increasing the flow rate of the first spray pipe 62, R1 is controlled to decrease or increase so as to fall within a specified range of R01. Similarly, by reducing or increasing the flow rate of the second spray pipe 63, R2 is controlled to decrease or increase to fall within a specified range of R02. In the embodiment of the present disclosure, the minimum value and the maximum value of R1 are both greater than the minimum value and the maximum value of R2, so that the first spray pipe 62 can fully supplement moisture to the slurry to cope with water evaporation during the process of conveying the slurry from the storage hopper 12 to the bearing groove 41. Moreover, the bearing groove 41 is close to the molding cylinder 43, and the scraper 32 scrapes part of the atomized liquid into the molding cylinder 43 during scraping. In order to control the humidity of the area in which the molding cylinder 43 is located at a low level (such that the gelling agent is smoothly converted from a dispersed state to a gel state), relatively less water needs to be replenished in the bearing groove 41, so the flow rate of the second spray pipe 63 is also smaller.

In order to further control the humidity of each area in the molding cavity and achieve a more accurate control effect, the humidity value of the area in which the molding cylinder 43 is located is measured in real time by the molding sensing member 83, the humidity value is set to R3, and a preset humidity parameter range of the area in which the molding cylinder 43 is located is R03.

In the embodiment of the present disclosure, the minimum value and the maximum value of R2 are both greater than the minimum value and the maximum value of R3, so as to ensure that the slurry in the molding cylinder 43 can volatilize water normally.

When R2 is greater than the maximum value of R02 and R3 is greater than a maximum value of R03, the flow rate of the second spray pipe 63 is reduced; or when R2 is greater than the maximum value of R02 and R3 is in the range of R03 or R3 is less than a minimum value of R03, the telescopic driving member 222 is started to drive the reversing member 223 to slide toward the feeding pipe 212 by a distance of L1, so as to increase a distance between the moving plate 2232 and the gas distribution port 215 and reduce a distance between the moving plate 2232 and the feeding pipe 212; or when R2 is less than the minimum value of R02 and R3 is greater than the maximum value of R03, the telescopic driving member 222 is started to drive the reversing member 223 to slide toward the gas distribution port 215 by a distance of L2, so as to reduce the distance between the moving plate 2232 and the gas distribution port 215 and increase the distance between the moving plate 2232 and the feeding pipe 212; or when R2 is less than the minimum value of R02 and R3 is in the range of R03 or R3 is less than the minimum value of R03, the flow rate of the second spray pipe 63 is increased.

Referring to FIG. 6, in order to finely control the humidity of the area in which the bearing groove 41 is located and the humidity of the area in which the molding cylinder 43 is located, the flow rate of the second spray pipe 63 is supplied to the area in which the bearing groove 41 is located and the area in which the molding cylinder 43 is located at the same time. In the embodiment of the present disclosure, the gas distribution mechanism 22 is configured to distribute the flow rates of the atomized liquid for the area in which the bearing groove 41 is located and the area in which the molding cylinder 43 is located. The flow rate assigned to the area in which the bearing groove 41 is located is set to Q1, and the flow rate assigned to the area in which the molding cylinder 43 is located is set to Q2.

Specifically, when the telescopic driving member 222 drives the reversing member 223 to slide toward the feeding pipe 212, a distance between the moving plate 2232 and the gas distribution port 215 is increased and a distance between the moving plate 2232 and the feeding pipe 212 is reduced. At this time, Q1 decreases while Q2 increases. When the telescopic driving member 222 drives the reversing member 223 to slide toward the gas distribution port 215, the distance between the moving plate 2232 and the gas distribution port 215 is reduced and the distance between the moving plate 2232 and the feeding pipe 212 is increased. At this time, Q1 increases while Q2 decreases.

When R2 is greater than the maximum value of R02 and R3 is greater than the maximum value of R03, both R2 and R3 exceed the preset humidity parameter ranges. Therefore, by reducing the flow rate of the second spray pipe 63, both Q1 and Q2 are reduced, such that the humidity in the area in which the bearing groove 41 is located and the area in which the molding cylinder 43 is located falls within the range of R02 and R03 respectively.

When R2 is greater than the maximum value of R02 and R3 is in the range of R03 or R3 is less than the minimum value of R03, the flow rate of Q1 is too large, while the flow rate of Q2 is normal or too small. At this time, the telescopic driving member 222 may be started to drive the reversing member 223 to slide towards the feeding pipe 212 by a distance of L1, so that Q1 decreases while Q2 increases, and thus the humidity in the area in which the bearing groove 41 is located and the humidity in the area in which the molding cylinder 43 is located fall within the ranges of R02 and R03 respectively. If R3 is greater than the maximum value of R03 after adjustment, the air blowing member 73 is started to create a negative pressure in the rear cavity 721, so that the atomized liquid in the area in which the molding cylinder 43 is located is discharged to the rear through hole 722 through the intermediate through hole 712, the intermediate cavity 711, and the exhaust port 713, to reduce the value of R3.

When R2 is less than the minimum value of R02 and R3 is greater than the maximum value of R03, the flow rate of Q1 is too small, while the flow rate of Q2 is too large. At this time, the telescopic driving member 222 may be started to drive the reversing member 223 to slide toward the gas distribution port 215 by a distance of L2, so that Q1 increases while Q2 decreases.

when R2 is less than the minimum value of R02 and R3 is in the range of R03 or R3 is less than the minimum value of R03, the flow rate of Q1 is too small while the flow rate of Q2 is normal or too small. At this time, the flow rate of the second spray pipe 63 can be increased, to increase Q1 and Q2 at the same time. If R3 is greater than the maximum value of R03 after adjustment, the air blowing member 73 is started to create a negative pressure in the rear cavity 721, so that the atomized liquid in the area in which the molding cylinder 43 is located is discharged to the rear through hole 722 through the intermediate through hole 712, the intermediate cavity 711, and the exhaust port 713, to reduce the value of R3.

Further, the method further includes the following steps:

when R3 is greater than the maximum value of R03 and R2 is in the range of R02, the telescopic driving member 222 is started to drive the reversing member 223 to slide toward the gas distribution port 215 by a distance of L3, so as to reduce the distance between the moving plate 2232 and the gas distribution port 215 and increase the distance between the moving plate 2232 and the feeding pipe 212, and/or the air blowing member 73 is started to create a negative pressure in the rear cavity 721, so as to discharge the atomized liquid in the area in which the molding cylinder 43 is located to the rear through hole 722 through the intermediate through hole 712, the intermediate cavity 711, and the exhaust port 713; or when R3 is less than the minimum value of R03 and R2 is in the range of R02, the flow rate of the second spray pipe 63 is increased.

When R3 is greater than the maximum value of R03 and R2 is in the range of R02, the flow rate of Q2 is too large while the flow rate of Q1 is normal. At this time, there are two control methods. In the first method, the telescopic driving member 222 is started to drive the reversing member 223 to slide toward the gas distribution port 215 by a distance of L3, so as to reduce the distance between the moving plate 2232 and the gas distribution port 215 and increase the distance between the moving plate 2232 and the feeding pipe 212, so that Q1 increases while Q2 decreases. If Q2 is less than the minimum value of R02 when reduced to a certain degree, the original position of the reversing member 223 is restored (that is, the telescopic driving member 222 is started to drive the reversing member 223 to slide toward the feeding pipe 212 by a distance of L3), the air blowing member 73 is started to create a negative pressure in the rear cavity 721, so as to discharge the atomized liquid in the area in which the molding cylinder 43 is located to the rear through hole 722 through the intermediate through hole 712, the intermediate cavity 711, and the exhaust port 713. At this time, the flow rate of Q1 is restored, and R2 is restored to the range of R02. Since the air blowing member 73 blows out part of the atomized liquid in the area in which the molding cylinder 43 is located, the atomized liquid in the area in which the molding cylinder 43 is located is reduced, so that R3 is adjusted to the range of R03.

At the beginning of the adjustment, the air blowing member 73 may alternatively be used for adjustment, so that Q1 remains unchanged, R2 is in the range of R02, and part of Q2 is blown away by the air blowing member 73. Therefore, the atomized liquid distributed in the area in which the molding cylinder 43 is located is reduced, so that R3 is adjusted to the range of R03.

When R3 is less than the minimum value of R03 and R2 is in the range of R02, Q2 is too small while Q1 is normal. At this time, the flow rate of the second spray pipe 63 is increased, so that Q1 and Q2 increase at the same time. If Q1 increases excessively to cause R2 to be greater than the maximum value of R02, the telescopic driving member 222 is driven to drive the reversing member 223 to slide toward the feeding pipe 212 by a distance of L4, so as to increase the distance between the moving plate 2232 and the gas distribution port 215 and reduce the distance between the moving plate 2232 and the feeding pipe 212. At this time, Q1 decreases while Q2 continues to increase until R2 and R3 are within the ranges of R02 and R03 respectively.

The magnitudes of L1-L4 depend on a difference between maximum values or minimum values of R3 and R03. Under the same humidity difference, the magnitudes of L1 and L4 are less than those of L2 and L3. This ensures that when Q2 increases, R3 does not quickly exceed the range of R03.

The above are merely preferred implementations of the present disclosure. It should be noted that those of ordinary skill in the art may further make several improvements and modifications without departing from the principle of the present disclosure, but such improvements and modifications should be deemed as falling within the protection scope of the present disclosure.

The invention claimed is:

1. A ceramic three-dimensional (3D) printing device based on a gel molding process, comprising a frame, and a feeding assembly, a receiving assembly, a scraping assembly, a bearing assembly, a scanning assembly and a spray assembly that are arranged on the frame, wherein the feeding assembly comprises a feeding pump and a storage hopper, an input end of the feeding pump communicates with the storage hopper, and an output end of the feeding pump communicates with a feeding rod of the receiving assembly;

the bearing assembly comprises a bearing groove, a scraping plate, a molding cylinder provided on the scraping plate, a lifting plate arranged at a bottom of the molding cylinder, and a lifting driving member in transmission connection with the lifting plate, an outlet of the feeding rod leads to the bearing groove, the bearing groove is connected to the scraping plate, and the lifting driving member is configured to drive the lifting plate to ascend and descend in the molding cylinder;

the scraping assembly comprises a movement driving mechanism and a scraper, and the movement driving mechanism is configured to drive the scraper to move on the bearing groove and the scraping plate so as to scrape slurry into the molding cylinder;

the scanning assembly is arranged over the molding cylinder and is configured to scan and cure the slurry on the molding cylinder according to a preset pattern; and the spray assembly comprises an atomizing box for atomizing a liquid, and a first spray pipe and a second spray pipe that communicate with the atomizing box, an outlet of the first spray pipe leads to the storage hopper, the feeding rod comprises a gas distribution pipe and a feeding pipe arranged at a middle portion of the gas distribution pipe, the output end of the feeding pump communicates with an upper end of the feeding pipe, a lower end of the feeding pipe faces the bearing groove, a gas inlet is provided in the gas distribution pipe, the second spray pipe communicates with the gas inlet, a gas distribution cavity running through two ends of the gas distribution pipe is provided in the gas distribution pipe, and the gas inlet communicates with the feeding pipe through the gas distribution cavity.

2. A control method, used for controlling the ceramic 3D printing device based on a gel molding process according to claim 1, and comprising the following steps:

a) starting the atomizing box to atomize a liquid, and introducing the atomized liquid into the storage hopper and the bearing groove through the first spray pipe and the second spray pipe respectively;

b) driving the feeding pump to extract slurry from the storage hopper and introducing the slurry into the feeding rod;

c) driving the scraper to move on the bearing groove and the scraping plate so as to scrape the slurry into the molding cylinder;

d) driving the scanning assembly to scan and cure the slurry on the molding cylinder according to a preset pattern;

e) driving the lifting plate to descend by a preset height;

f) repeating steps c-e until a three-dimensional model is obtained; and g) taking out the three-dimensional model, cleaning with water or alcohol, and obtaining a sample after gel discharging and sintering;

wherein, during the above process, humidity values of an area in which the storage hopper is located and an area in which the bearing groove is located are detected in real time, each humidity value is compared with a preset humidity parameter range, and if the humidity value is not within the preset humidity parameter range, flow rates of the first spray pipe and/or the second spray pipe are adjusted to make the humidity value falls within the preset humidity parameter range.

3. The control method according to claim 2, wherein the humidity values of the area in which the storage hopper is located and the area in which the bearing groove is located that are detected in real time are set to R1 and R2, and the preset humidity parameter ranges of the area in which the storage hopper is located and the area in which the bearing groove is located are R01 and R02; and the step of adjusting flow rates of the first spray pipe and/or the second spray pipe to make the humidity value falls within the preset humidity parameter range comprises:

when R1 is greater than a maximum value of R01, reducing the flow rate of the first spray pipe; or when R1 is less than a minimum value of R01, increasing the flow rate of the first spray pipe; and when R2 is greater than a maximum value of R02, reducing the flow rate of the second spray pipe; or when R2 is less than a minimum value of R02, increasing the flow rate of the second spray pipe.

4. The ceramic 3D printing device based on a gel molding process according to claim 1, further comprising a pressure rod assembly, wherein the pressure rod assembly comprises two intermediate pressure rods, the two intermediate pressure rods are arranged on two sides of an upper surface of the scraping plate respectively, each of the two intermediate pressure rods is provided therein with one intermediate cavity, forming two intermediate cavities; a middle portion of each of the two intermediate pressure rods is provided with an intermediate through hole facing the molding cylinder and communicating with a corresponding one of the two intermediate cavities, forming a plurality of intermediate through holes; the two ends of the gas distribution pipe are each provided with a gas distribution port communicating with the gas distribution cavity, forming a plurality of gas distribution ports; ends of the two intermediate cavities communicate with the plurality of gas distribution ports at the two ends of the gas distribution pipe respectively, and the other ends of the two intermediate cavities each are provided with an exhaust port, forming a plurality of exhaust ports.

5. The ceramic 3D printing device based on a gel molding process according to claim 4, wherein the pressure rod assembly further comprises a rear pressure rod, each of the two intermediate pressure rods has an end proximate to the feeding rod and an end away from the feeding rod, the rear pressure rod is arranged at the end away from the feeding rod of each of the two intermediate pressure rods, side portions of two ends of the rear pressure rod each communicate with a corresponding one of the plurality of exhaust ports, the rear pressure rod is provided therein with a rear cavity with two through ends, the rear cavity communicates with each of the two intermediate cavities through the corresponding one of the plurality of exhaust ports, air blowing members are arranged at two ends of the rear cavity respectively, a side portion of the rear pressure rod is further provided with a rear through hole communicating with the rear cavity, the rear through hole faces away from the scraping plate, and an air outlet of each of the air blowing members faces the rear through hole.

6. The ceramic 3D printing device based on a gel molding process according to claim 5, wherein the receiving assembly further comprises a gas distribution mechanism, the gas distribution mechanism comprises two sliding holes, each of the two sliding holes is provided in a side portion of the gas distribution pipe and communicates with the gas distribution cavity; the number of the gas inlet is two, and each of the two sliding holes and a corresponding one of the two gas inlets communicate with each other, and each of the two sliding holes is provided between a corresponding one of the plurality of gas distribution ports and the feeding pipe; the gas distribution mechanism further comprises a telescopic driving member and a reversing member in transmission connection with the telescopic driving member, the reversing member is capable of being inserted into each of the two sliding holes, and the telescopic driving member is configured to drive the reversing member to slide in each of the two sliding holes toward the corresponding one of the plurality of gas distribution ports or the feeding pipe, such that the corresponding one of the two gas inlets communicates with the feeding pipe and/or the corresponding one of the plurality of gas distribution ports.

7. The ceramic 3D printing device based on a gel molding process according to claim 6, wherein each of the two sliding holes is provided in a sliding groove disposed in the side portion of the gas distribution pipe, the reversing member comprises a sealing plate and a moving plate, the moving plate is vertically fixed to a middle portion of the sealing plate, the moving plate is capable of being inserted into each of the two sliding holes, the sealing plate is capable of moving in the sliding groove, the sealing plate is connected to the telescopic driving member, the moving plate is perpendicular to a length direction of the gas distribution cavity, the moving plate is capable of moving in each of the two sliding holes, and the sealing plate is capable of keeping sealing each of the two sliding holes when the moving plate moves.

8. The ceramic 3D printing device based on a gel molding process according to claim 7, further comprising a humidity sensing assembly, wherein the humidity sensing assembly comprises a storage sensing member, a feeding sensing member, and a molding sensing member; and the storage sensing member, the feeding sensing member, and the molding sensing member are arranged above the storage hopper, the feeding rod, and the plurality of intermediate through holes respectively.

9. A control method, used for controlling the ceramic 3D printing device based on a gel molding process according to claim 7, and comprising the following steps:

a) starting the atomizing box to atomize a liquid, and introducing the atomized liquid into the storage hopper and the bearing groove through the first spray pipe and the second spray pipe respectively;

b) driving the feeding pump to extract slurry from the storage hopper and introducing the slurry into the feeding rod;

c) driving the scraper to move on the bearing groove and the scraping plate so as to scrape the slurry into the molding cylinder;

d) driving the scanning assembly to scan and cure the slurry on the molding cylinder according to a preset pattern;

e) driving the lifting plate to descend by a preset height;

f) repeating steps c-e until a three-dimensional model is obtained; and g) taking out the three-dimensional model, cleaning with water or alcohol, and obtaining a sample after gel discharging and sintering;

wherein, during the above process, humidity values of an area in which the storage hopper is located and an area in which the bearing groove is located are detected in real time, each humidity value is compared with a preset humidity parameter range, and if the humidity value is not within the preset humidity parameter range, flow rates of the first spray pipe and/or the second spray pipe are adjusted to make the humidity value falls within the preset humidity parameter range.

10. The control method according to claim 9, wherein the humidity values of the area in which the storage hopper is located and the area in which the bearing groove is located that are detected in real time are set to R1 and R2, and the preset humidity parameter ranges of the area in which the storage hopper is located and the area in which the bearing groove is located are R01 and R02; and the step of adjusting flow rates of the first spray pipe and/or the second spray pipe to make the humidity value falls within the preset humidity parameter range comprises:

when R1 is greater than a maximum value of R01, reducing the flow rate of the first spray pipe; or when R1 is less than a minimum value of R01, increasing the flow rate of the first spray pipe; and when R2 is greater than a maximum value of R02, reducing the flow rate of the second spray pipe; or when R2 is less than a minimum value of R02, increasing the flow rate of the second spray pipe.

11. The control method according to claim 10, wherein a humidity value of an area in which the molding cylinder is located, which is detected in real time, is R3, and a preset humidity parameter range of the area in which the molding cylinder is located is R03; and the method further comprises the following steps:

when R2 is greater than the maximum value of R02 and R3 is greater than a maximum value of R03, reducing the flow rate of the second spray pipe; or when R2 is greater than the maximum value of R02 and R3 is in the range of R03 or R3 is less than a minimum value of R03, starting the telescopic driving member to drive the reversing member to slide toward the feeding pipe, so as to increase a distance between the moving plate and the corresponding one of the plurality of gas distribution ports and reduce a distance between the moving plate and the feeding pipe; or when R2 is less than the minimum value of R02 and R3 is greater than the maximum value of R03, starting the telescopic driving member to drive the reversing member to slide toward the corresponding one of the plurality of gas distribution ports, so as to reduce the distance between the moving plate and the corresponding one of the plurality of gas distribution ports and increase the distance between the moving plate and the feeding pipe; or when R2 is less than the minimum value of R02 and R3 is in the range of R03 or R3 is less than the minimum value of R03, increasing the flow rate of the second spray pipe.

12. The control method according to claim 11, further comprising the following steps:

when R3 is greater than the maximum value of R03 and R2 is in the range of R02, starting the telescopic driving member to drive the reversing member to slide toward the corresponding one of the plurality of gas distribution ports, so as to reduce the distance between the moving plate and the corresponding one of the plurality of gas distribution ports and increase the distance between the moving plate and the feeding pipe, and/or starting at least one of the air blowing members to create a negative pressure in the rear cavity, so as to discharge the atomized liquid in the area in which the molding cylinder is located to the rear through hole through a corresponding one of the plurality of intermediate through holes, a corresponding one of the two intermediate cavities, and a corresponding one of the plurality of exhaust ports that are each on a same side of the upper surface of the scraping plate as the at least one of the air blowing members; or when R3 is less than the minimum value of R03 and R2 is in the range of R02, increasing the flow rate of the second spray pipe, and/or driving the telescopic driving member to drive the reversing member to slide toward the feeding pipe, so as to increase a distance between the moving plate and the corresponding one of the plurality of gas distribution ports and reduce a distance between the moving plate and the feeding pipe.

* * * * *